(12) United States Patent
Sarkar et al.

(10) Patent No.: US 8,208,403 B2
(45) Date of Patent: Jun. 26, 2012

(54) DEFINING AN END-TO-END PATH FOR A NETWORK SERVICE

(75) Inventors: Ashis Sarkar, Tampa, FL (US); Dhaval V. Thaker, Tampa, FL (US); Ashish Mehta, Tampa, FL (US)

(73) Assignee: Verizon Patent and Licensing Inc., Basking Ridge, NJ (US)

(*) Notice: Subject to any disclaimer, the term of this patent is extended or adjusted under 35 U.S.C. 154(b) by 305 days.

(21) Appl. No.: 11/964,111

(22) Filed: Dec. 26, 2007

(65) Prior Publication Data

US 2009/0168786 A1 Jul. 2, 2009

(51) Int. Cl.
  *H04L 12/28* (2006.01)
(52) U.S. Cl. .................... 370/254; 370/401
(58) Field of Classification Search .............. None
  See application file for complete search history.

(56) References Cited

U.S. PATENT DOCUMENTS

| | | | | |
|---|---|---|---|---|
| 5,065,393 | A * | 11/1991 | Sibbitt et al. | 370/360 |
| 5,521,910 | A * | 5/1996 | Matthews | 370/256 |
| 6,549,521 | B1 * | 4/2003 | Edwards et al. | 370/255 |
| 6,553,002 | B1 * | 4/2003 | Bremer et al. | 370/254 |
| 6,661,795 | B1 * | 12/2003 | Adas et al. | 370/395.1 |
| 6,697,325 | B1 * | 2/2004 | Cain | 370/255 |
| 6,728,205 | B1 * | 4/2004 | Finn et al. | 370/217 |
| 6,778,535 | B1 * | 8/2004 | Ash et al. | 370/395.21 |
| 6,791,939 | B1 * | 9/2004 | Steele et al. | 370/217 |
| 6,963,927 | B1 * | 11/2005 | Lee et al. | 370/238 |
| 7,145,865 | B1 * | 12/2006 | Meggison et al. | 370/397 |
| 7,293,106 | B2 * | 11/2007 | Natarajan et al. | 370/254 |
| 7,362,709 | B1 * | 4/2008 | Hui et al. | 370/237 |
| 7,440,413 | B1 * | 10/2008 | Tang | 370/395.1 |
| 7,561,519 | B1 * | 7/2009 | Ash et al. | 370/235 |
| 7,742,426 | B2 * | 6/2010 | Schumacher et al. | 370/248 |
| 2001/0028653 | A1 * | 10/2001 | Endo et al. | 370/397 |
| 2002/0044549 | A1 * | 4/2002 | Johansson et al. | 370/255 |
| 2002/0120745 | A1 * | 8/2002 | Oishi et al. | 370/395.4 |
| 2003/0076825 | A1 * | 4/2003 | Guruprasad | 370/389 |
| 2003/0225906 | A1 * | 12/2003 | Natarajan et al. | 709/238 |
| 2005/0163057 | A1 * | 7/2005 | Blackburn | 370/395.1 |
| 2006/0045132 | A1 * | 3/2006 | Metke | 370/395.2 |
| 2007/0110028 | A1 * | 5/2007 | Wu | 370/352 |
| 2008/0080517 | A1 * | 4/2008 | Roy et al. | 370/395.5 |

* cited by examiner

*Primary Examiner* — Chirag Shah
*Assistant Examiner* — Joshua Smith

(57) ABSTRACT

A device receives, from a customer, a request for an end-to-end path through a network, determines parameters of a query based on the request and path criteria, and executes the query on a database of network elements capable of being included in the end-to-end path. The device also selects one or more of the network elements provided in the database based on results of the query, and reserves, in the database, the one or more selected network elements for the end-to-end path.

25 Claims, 10 Drawing Sheets

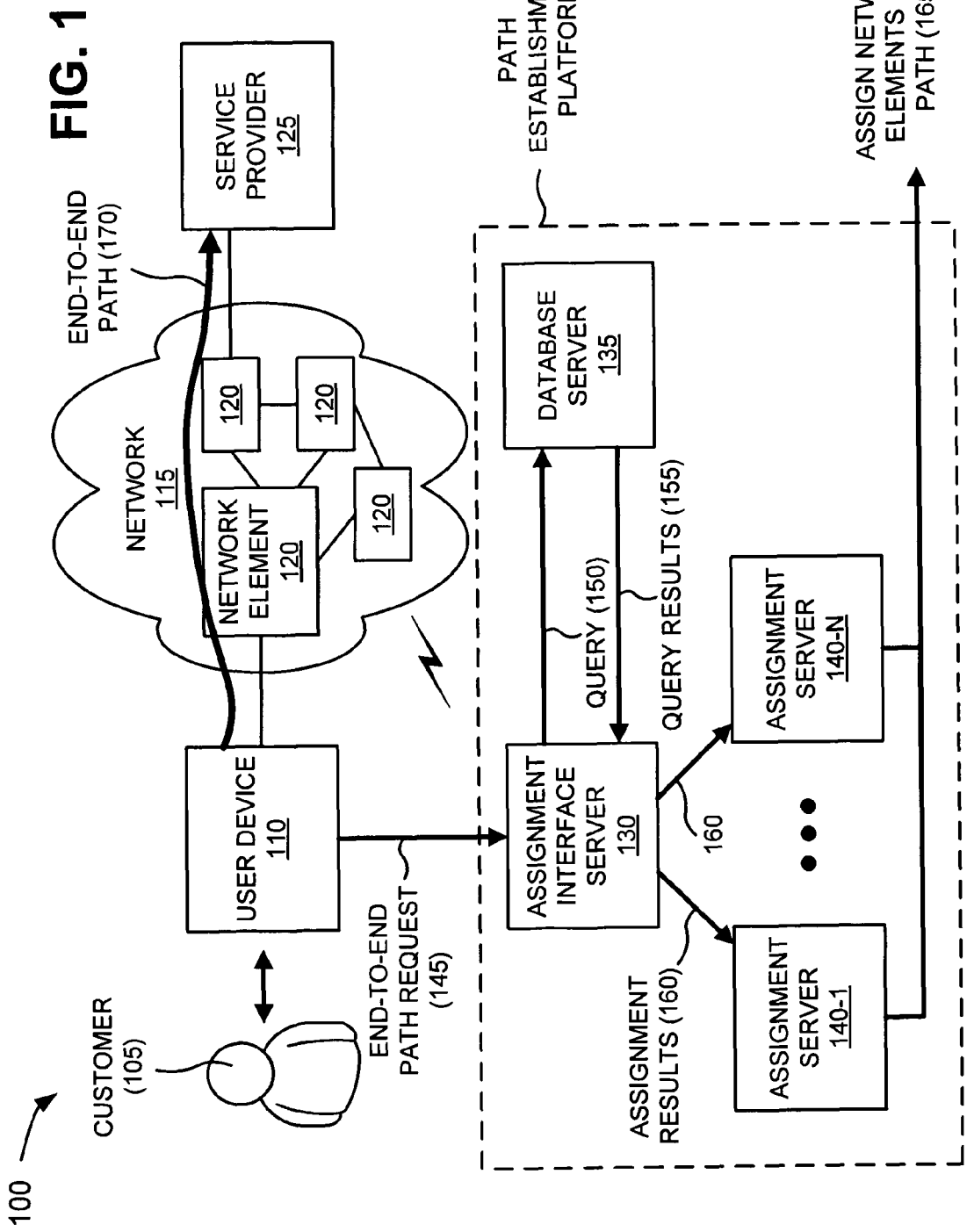

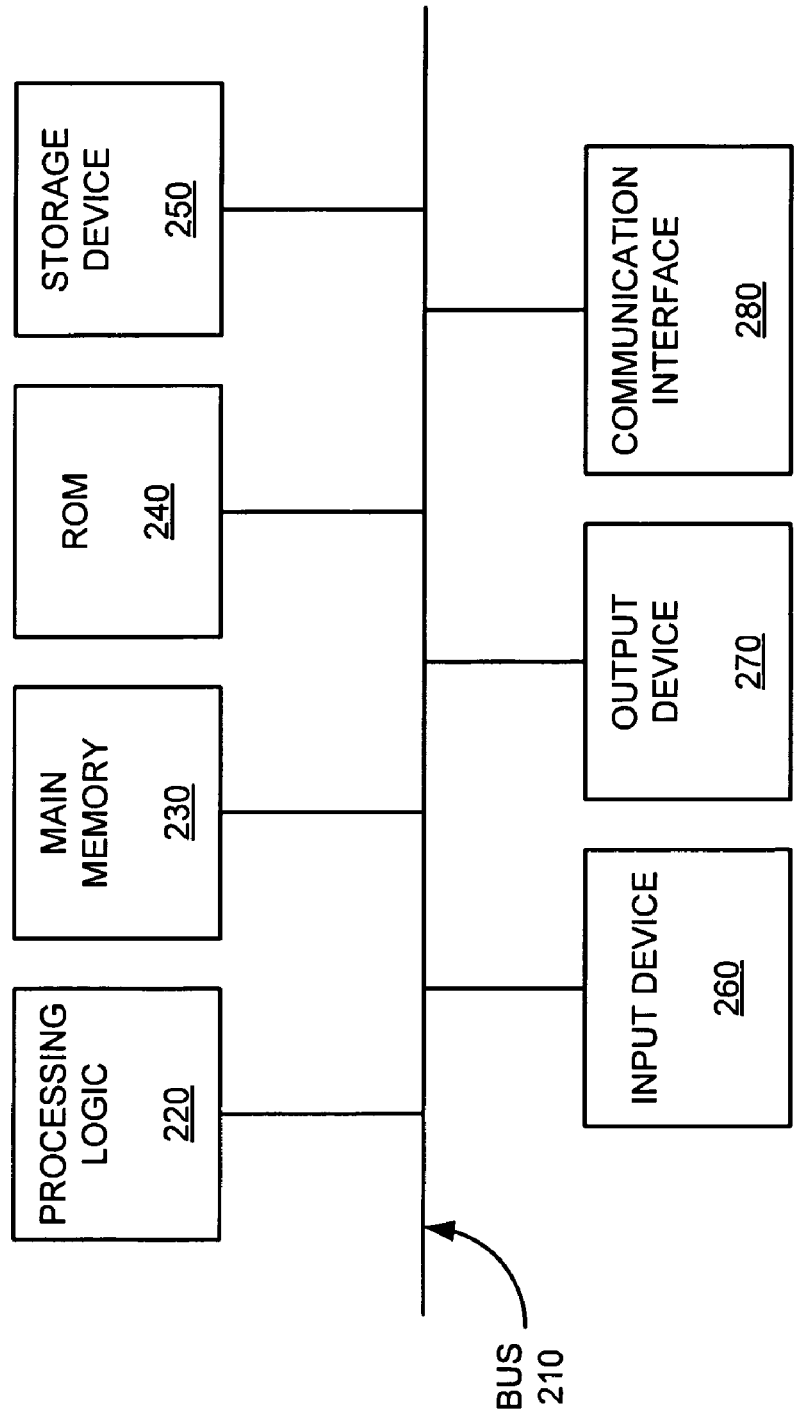

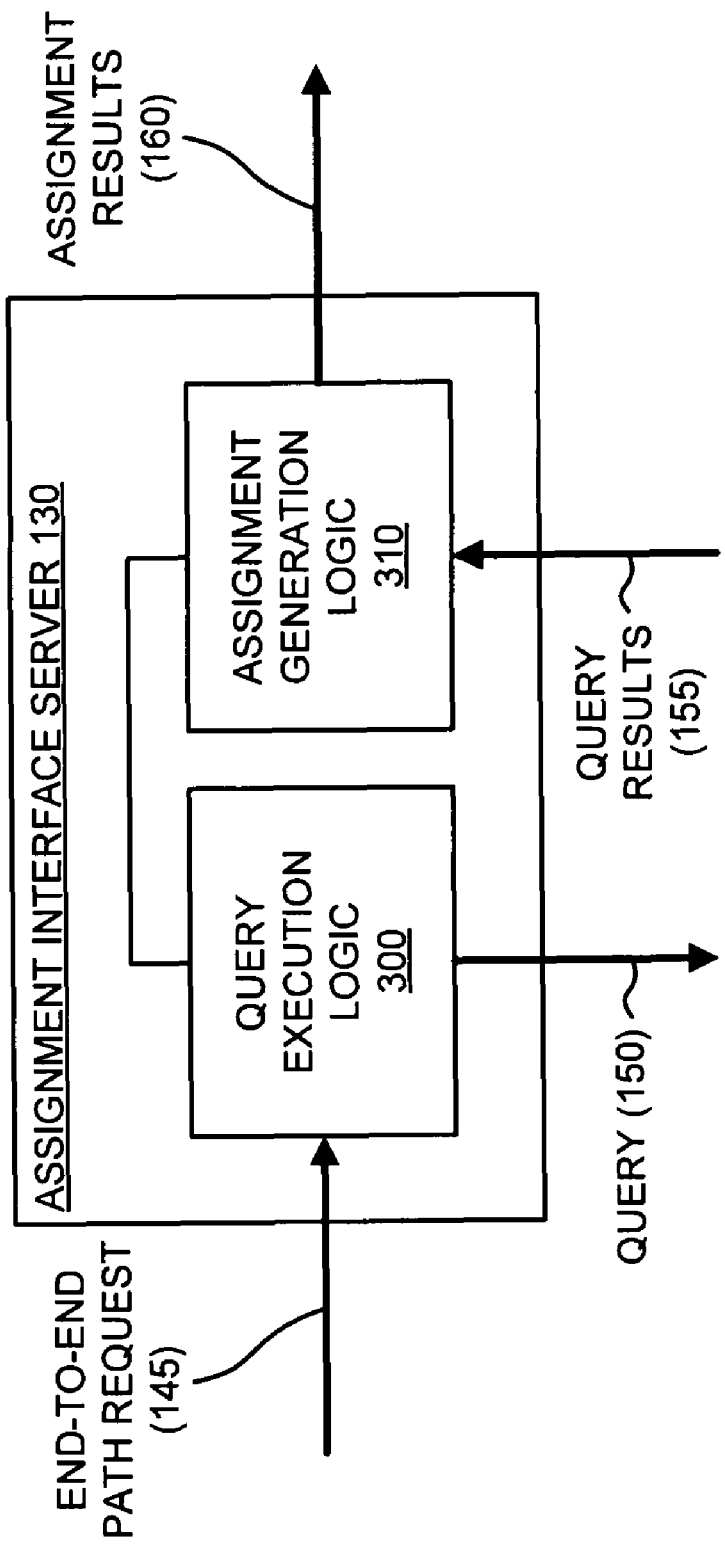

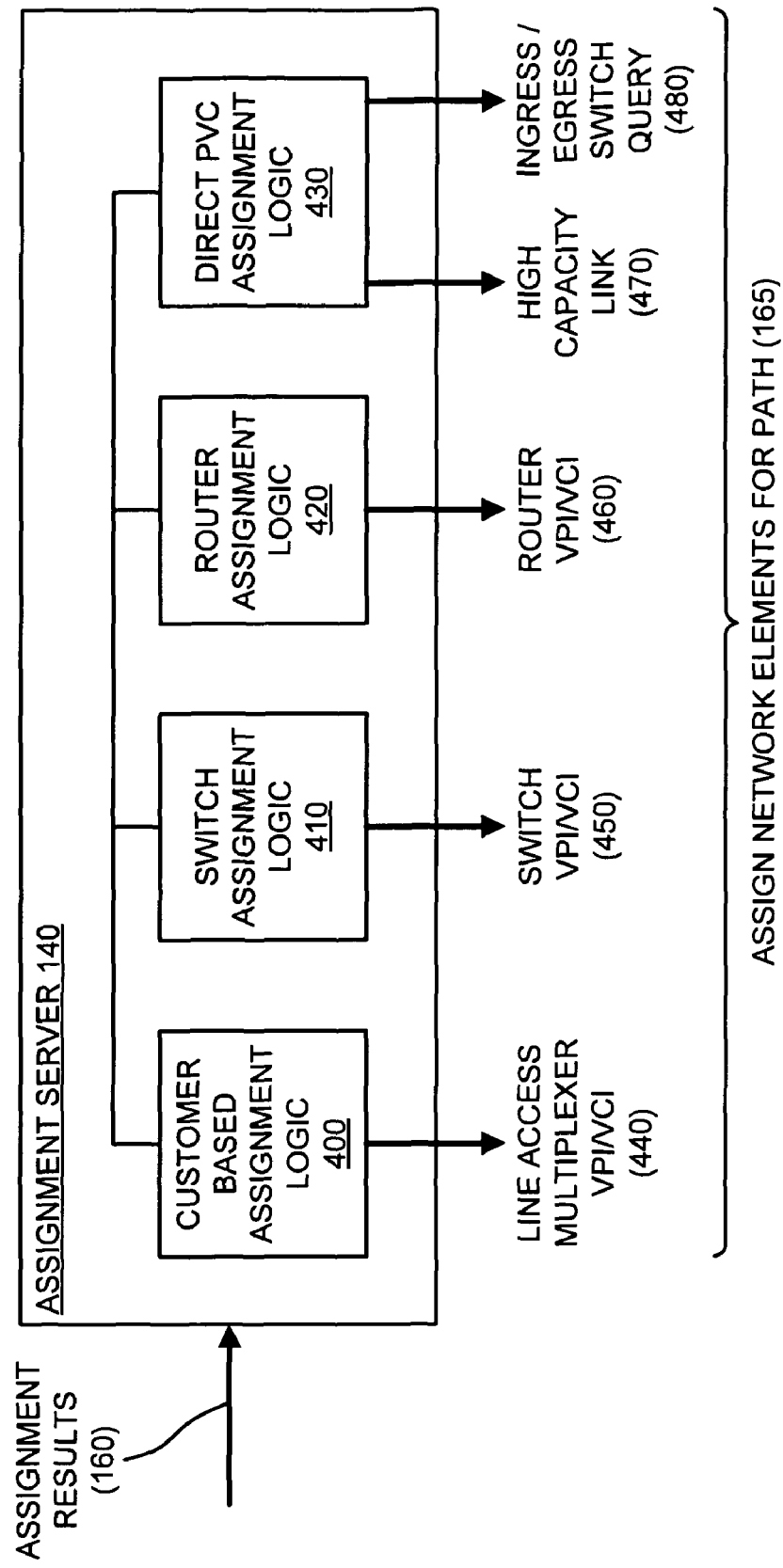

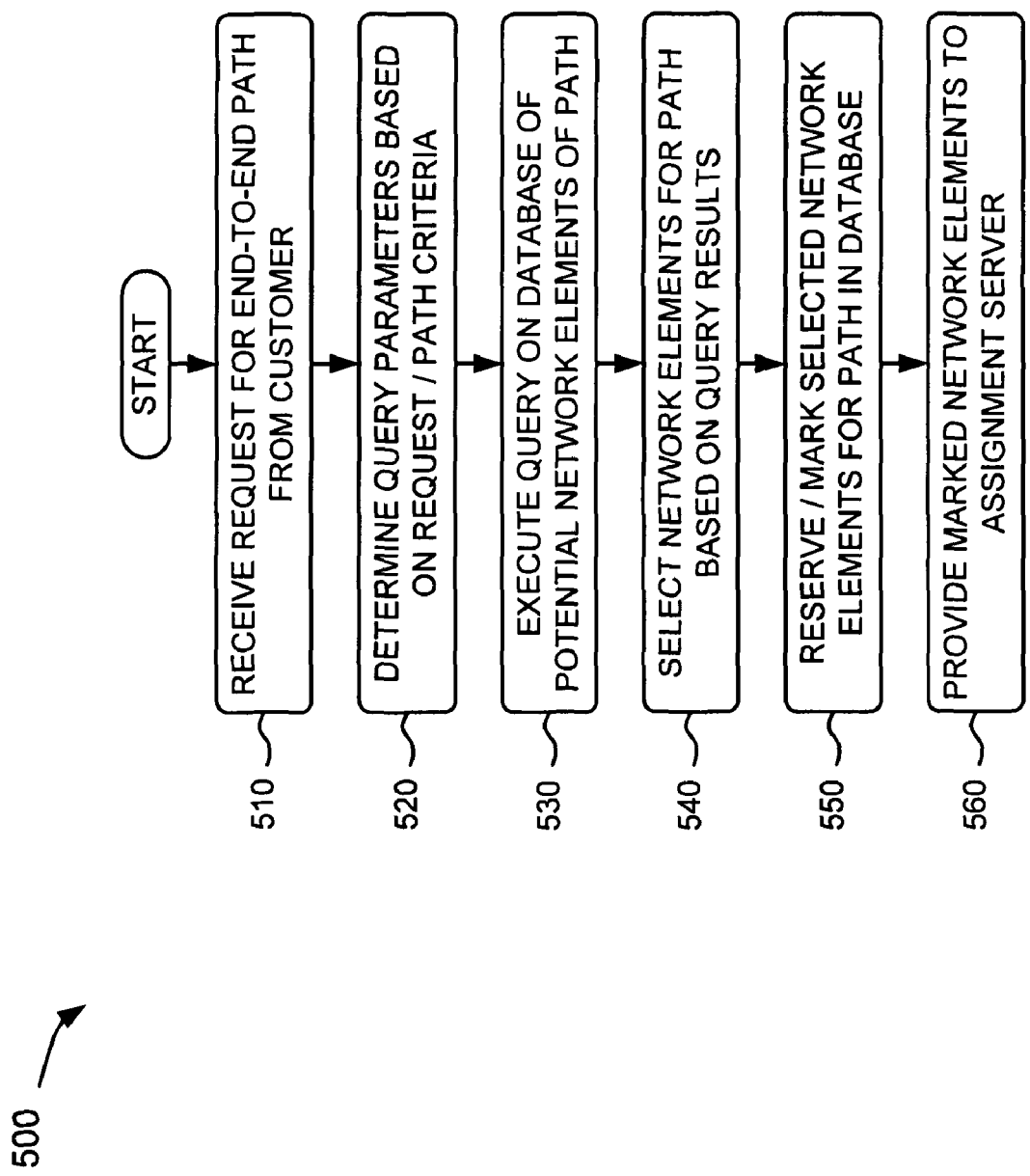

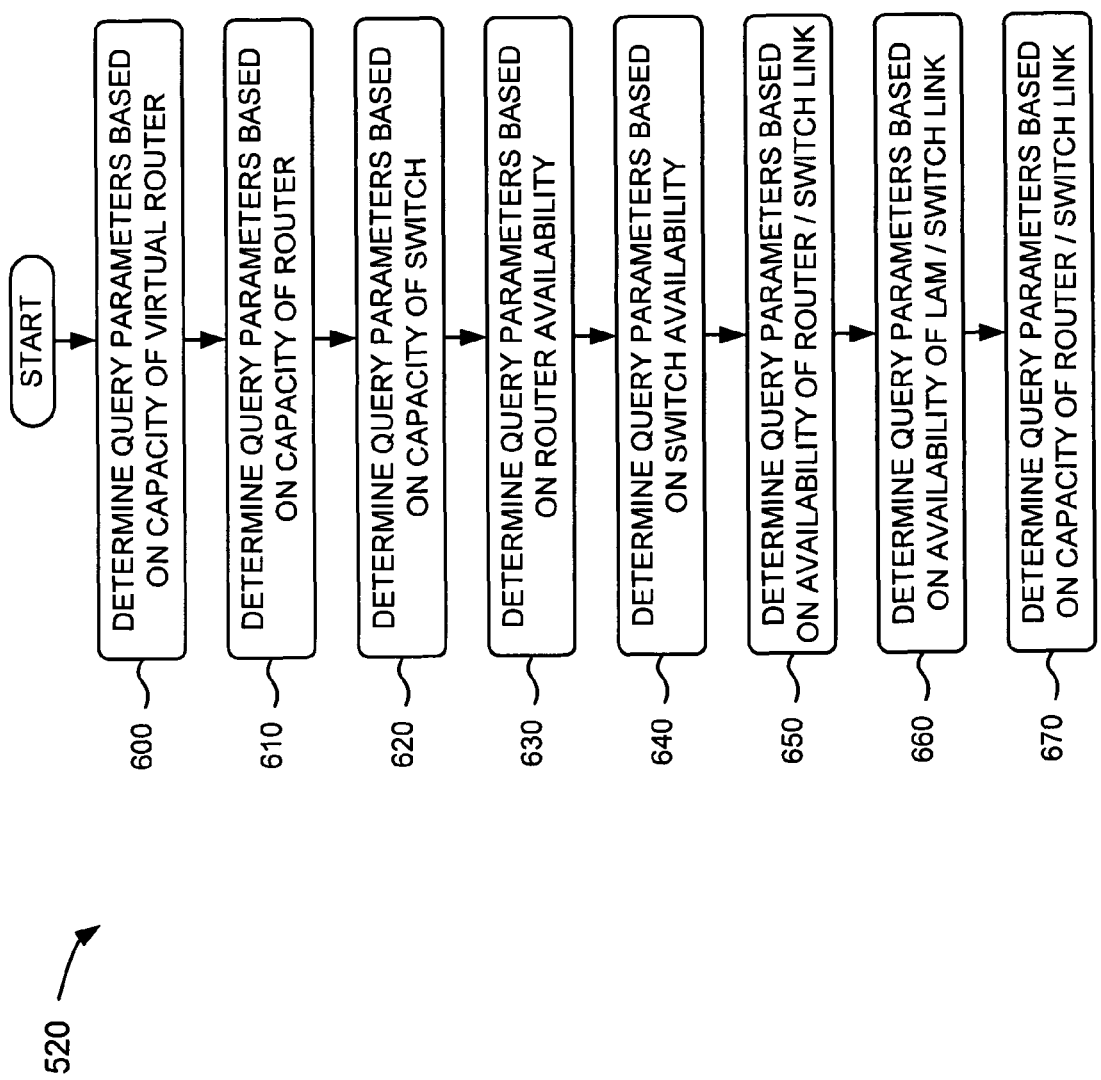

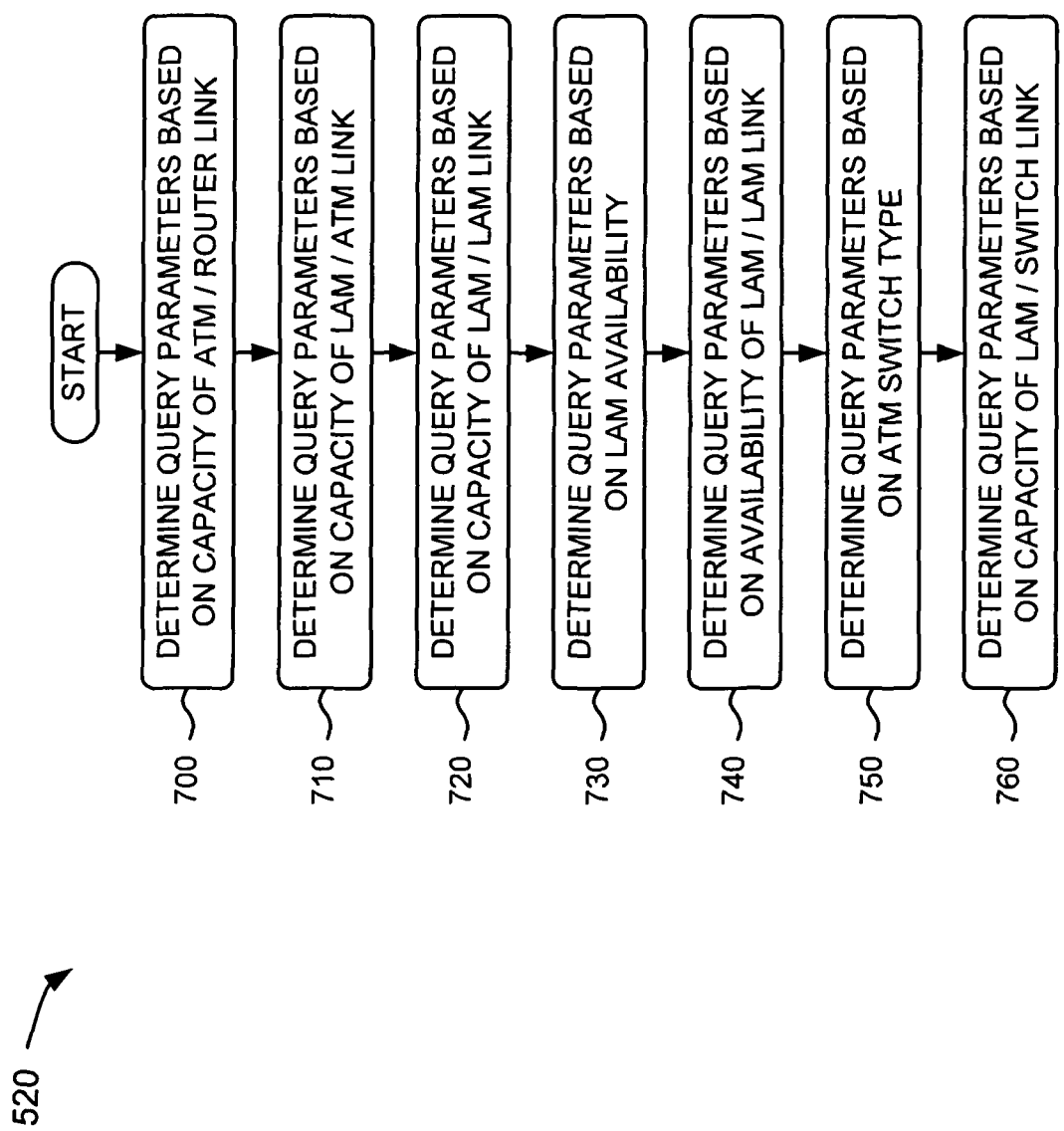

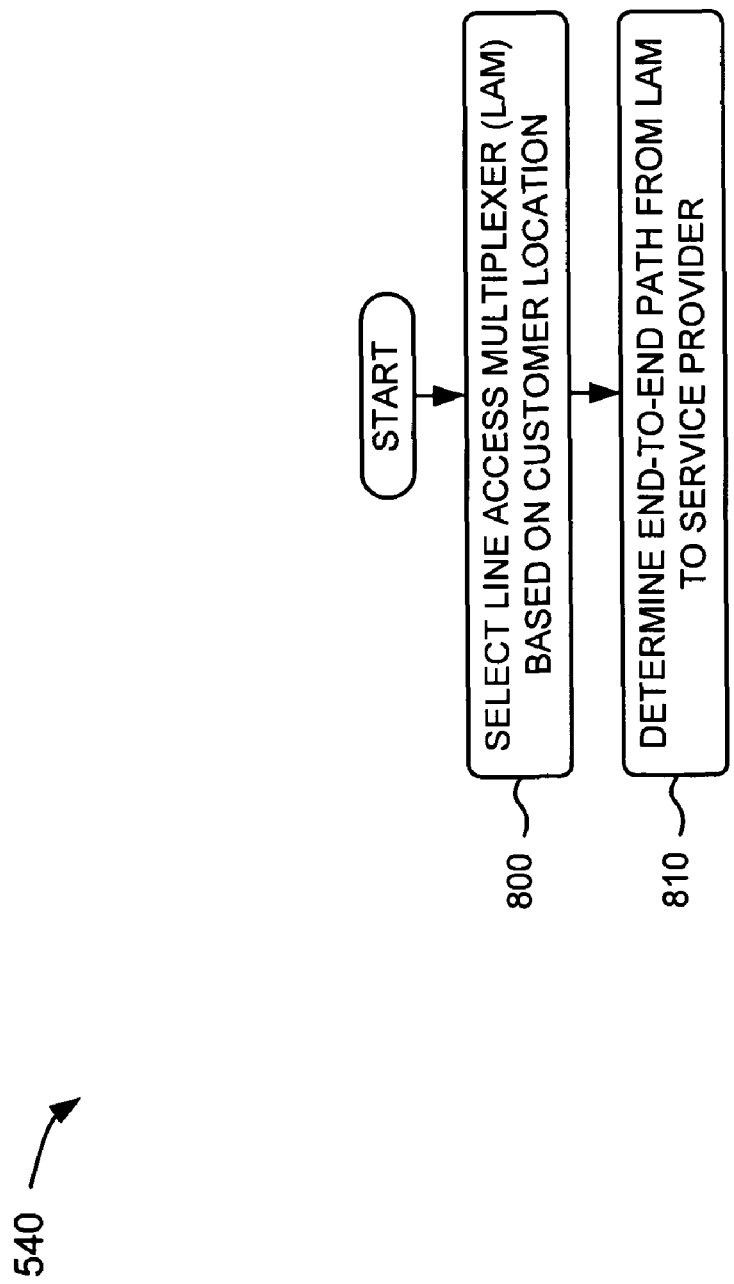

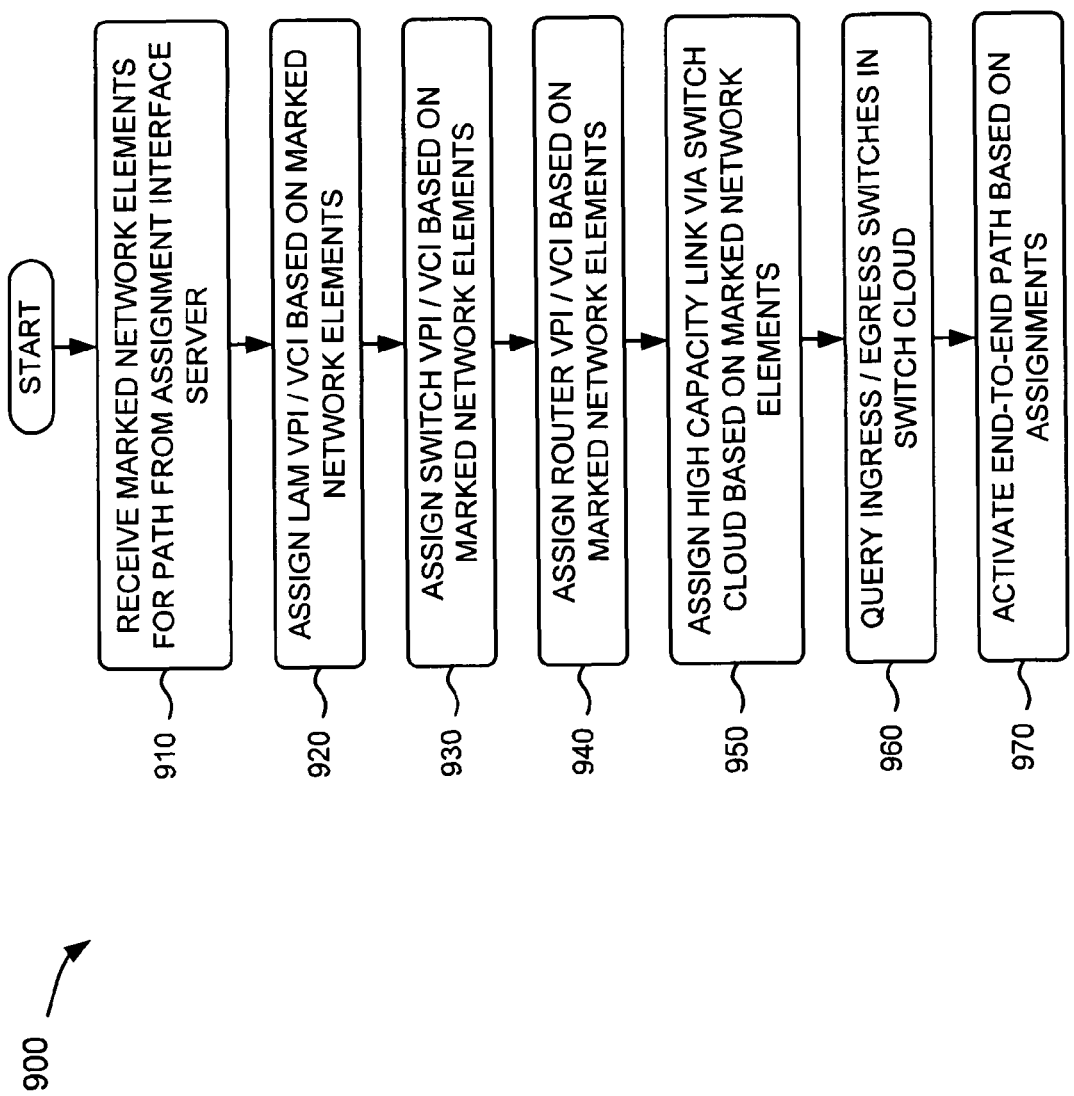

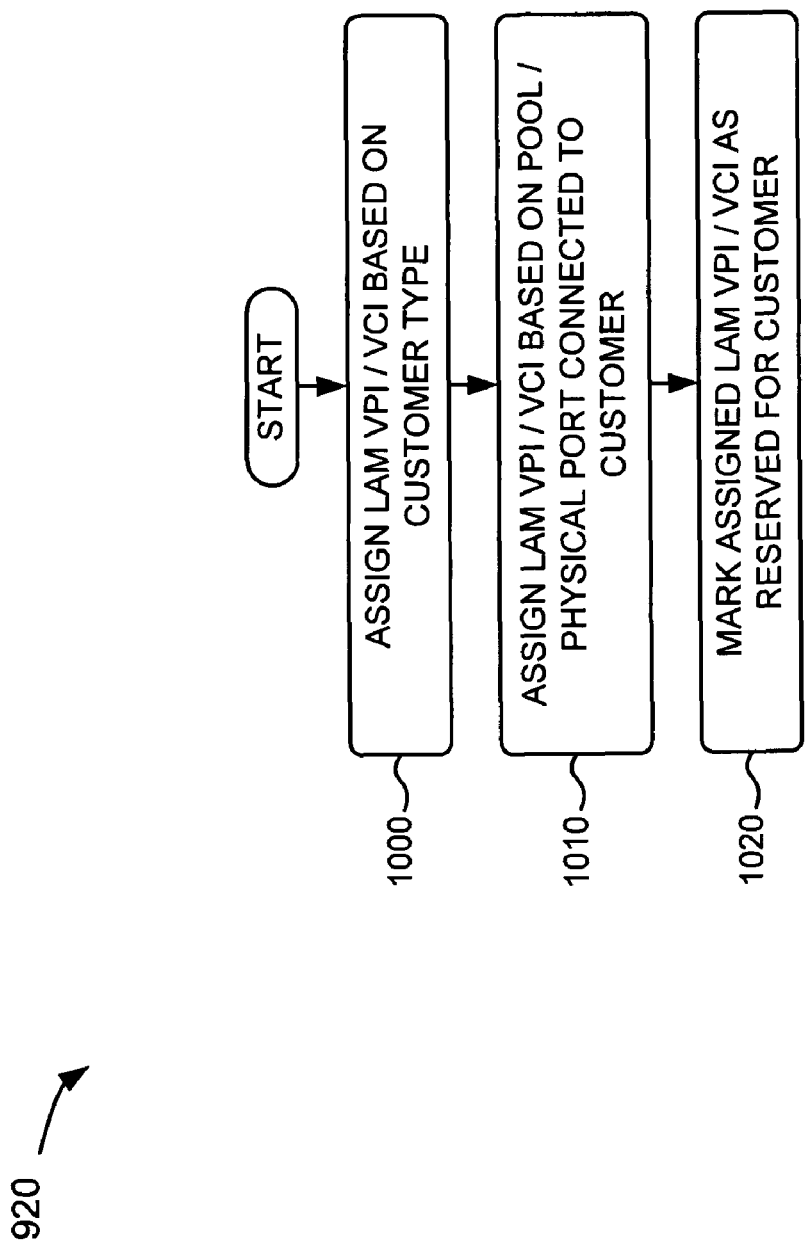

A customer (e.g., individuals) may connect to a network service (e.g., a service provided by an Internet service provider or ISP) via an end-to-end path defined in one or more networks. Similarly, business customers may connect to a network service (e.g., a switch cloud or a high capacity link of an ISP) via an end-to-end path defined in one or more networks. An end-to-end path may include a path of network elements (e.g., switches, routers, etc.) that connects one point (e.g., a customer) to another point (e.g., a network service). When new network service connections are requested, a network provider assigns the end-to-end paths from the customers to the network services. However, as the number of network service requests increases, it becomes increasingly difficult to assign multiple end-to-end paths. For example, serially assigning end-to-end paths to multiple network service requests may require an inordinate amount of time, and/or assigning end-to-end paths to multiple network requests in parallel may result in resource conflicts (e.g., when network elements are assigned, they define a unique path for each customer).

DEFINING AN END-TO-END PATH FOR A NETWORK SERVICE

BACKGROUND

BRIEF DESCRIPTION OF THE DRAWINGS

FIG. 1 is an exemplary diagram of a network in which systems and methods described herein may be implemented;

FIG. 2 illustrates exemplary components of a user device, a service provider, an assignment interface server, an assignment server, and/or a database server of the network depicted in FIG. 1;

FIG. 3 depicts an exemplary functional block diagram of the assignment interface server of the network illustrated in FIG. 1;

FIG. 4 illustrates an exemplary functional block diagram of the assignment server of the network illustrated in FIG. 1; and FIGS. 5-10 depict flow charts of exemplary processes according to implementations described herein.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may include systems and/or methods that define an end-to-end path for a large volume of new network service requests without causing resource conflicts. For example, in one implementation, the systems and/or methods may receive a request for an end-to-end path (e.g., a request for a network service) from a customer, and may determine query parameters based on the request and/or various path criteria (e.g., status, availability, etc. of network elements, links between network elements, etc.). The query may be executed on a database of potential network elements that may form the end-to-end path, and network elements for the end-to-end path may be selected based on the query results. The selected network elements may be reserved (or marked as "in use") in the database, and the reserved or marked network elements may be output for activation of the end-to-end path.

A "network service," as the term is used herein, is to be broadly interpreted to include any act or variety of work done for others (e.g., for compensation). For example, in one implementation, a network service may include telecommunications services, such as telephone services, Internet services, network data services, radio services, television services, video services, etc.

FIG. 1 is an exemplary diagram of a network 100 in which systems and methods described herein may be implemented. As illustrated, network 100 may include a customer 105, a user device 110, a network 115 with network elements 120, a service provider 125, an assignment interface server 130, a database server 135, and assignment servers 140-1, ... 140-N (e.g., collectively referred to as "assignment servers 140" or singularly as "assignment server 140"). User device 110, service provider 125, assignment interface server 130, database server 135, and/or assignment servers 140 may connect to network 115 via wired and/or wireless connections. A single customer, a single user device, a single network, four network elements, a single service provider, a single assignment interface server, a single database server, and two assignment servers have been illustrated in FIG. 1 for simplicity. In practice, there may be more or different customers, user devices, networks, network elements, service providers, assignment interface servers, database servers, and/or assignment servers. Also, in some instances, one or more of user device 110, network 115, network elements 120, service provider 125, assignment interface server 130, database server 135, and/or assignment servers 140 may perform one or more functions described as being performed by another one or more of user device 110, network 115, network elements 120, service provider 125, assignment interface server 130, database server 135, and/or assignment servers 140.

Customer 105 may include any person or business entity (e.g., a company) capable of purchasing one or more network services offered by service provider 125. In one implementation, for example, customer 105 may include a purchaser or a potential purchaser of telecommunications services provided by service provider 125, an existing customer or a potential customer of telecommunications services, etc.

User device 110 may include a radiotelephone, a PCS terminal (e.g., that may combine a cellular radiotelephone with data processing and data communications capabilities), a personal digital assistant (PDA) (e.g., that can include a radiotelephone, a pager, Internet/intranet access, etc.), a laptop, a personal computer, or other types of computation or communication devices, threads or processes running on these devices, and/or objects executable by these devices. In one implementation, user device 110 may include any device that is capable of requesting an end-to-end path (e.g., through network 115) from user device 110 to service provider 125. In another implementation, user device 110 may include any device that enables a customer (e.g., a network service customer) to access the network services provided by service provider 125.

Network 115 may include a local area network (LAN), a wide area network (WAN), a metropolitan area network (MAN), an intranet, the Internet, a Public Land Mobile Network (PLMN), a telephone network, such as the Public Switched Telephone Network (PSTN) or a cellular telephone network, or a combination of networks.

Each of network elements 120 may include a data transfer device, such as a gateway, a router, a switch (e.g., an asynchronous transfer mode (ATM) switch), a firewall, a network interface card (NIC), a hub, a bridge, a proxy server, an optical add-drop multiplexer (OADM), a line access multiplexer (LAM), a permanent or private virtual circuit (PVC), links provided between any of the aforementioned devices, or some other type of device that processes and/or transfers data.

In one example, one or more network elements 120 may be capable of establishing an end-to-end path between user device 110 and service provider 125.

Service provider 125 may include one or more server entities, or other types of computation or communication devices, that gather, process, search, and/or provide information in a manner described herein. In one implementation, service provider 125 may be capable of providing a network service (e.g., a telephone service, an Internet service, network content services, such as services providing a file, a web page, an email, an instant message, etc.) to one or more customers (e.g., customer 105).

Assignment interface server 130 may include one or more server entities, or other types of computation or communication devices, that gather, process, search, and/or provide information in a manner described herein. In one implementation, assignment interface server 130 may define an end-to-end path between user device 110 and service provider 125, via network 115, and may provide the defined end-to-end path to one or more assignment servers 140 for activation of the defined end-to-end path. Further details of assignment interface server 130 are provided below in connection with FIG. 3.

Database server 135 may include one or more server entities, or other types of computation or communication devices, that gather, process, search, and/or provide information in a manner described herein. In one implementation, database server 135 may include one or more devices that may receive and/or store information (e.g., in one or more databases) associated with network 115 and/or network elements 120 that may be used to define an end-to-end path. For example, database server 135 may store information (e.g., in one or more databases), such as capacity information associated with network elements 120 and/or links between network elements 120, availability status information associated with network elements 120 and/or links between network elements 120, bandwidth information associated with network elements 120 and/or links between network elements 120, etc. Assignment interface server 130 may use such information to determine an end-to-end path between user device and service provider 125, via network 115. Although database server 135 is shown as being separate from assignment interface server 130, in one implementation, database server 135 may be incorporated within assignment interface server 130.

Each of assignment servers 140 may include one or more server entities, or other types of computation or communication devices, that gather, process, search, and/or provide information in a manner described herein. In one implementation, each of assignment servers 140 may receive the defined end-to-end path from assignment interface server 130, may assign the end-to-end path to one or more network elements 120, and may activate the assigned one or more network elements 120 for the end-to-end path. Further details of assignment servers 140 are provided below in connection with FIG. 4.

As further shown in FIG. 1, customer 105, via user device 110, may provide an end-to-end path request 145 (e.g., requesting connection to service provider 125, requesting a network service provided by service provider 125, etc.) to assignment interface server 130. Assignment interface server 130 may receive end-to-end path request 145, and may determine parameters of a query 150 (e.g., a structured query language (SQL) query) based on request 145 and/or various path criteria (e.g., status, availability, capacity, etc. of network elements 120, links between network elements 120, etc.). Assignment interface server 130 may provide query 150 to database server 135 for execution on a database of potential network elements 120 that may form the end-to-end path, and may select or define one or more network elements 120 for the end-to-end path based on query results 155 from database server 135. Assignment interface server 130 may reserve (or mark as "in use") the selected one or more network elements 120 in the database (e.g., to avoid resource conflicts), and the reserved or marked network elements 120 may be output as assignment results 160 to assignment servers 140. One or more assignment servers 140 may receive assignment results 160, and may perform an assignment of network elements 120 for the path, as indicated by reference number 165. Multiple assignment servers 140 may permit handling of large volumes of new network service requests. An end-to-end path 170 may be activated in network 115 (e.g., based on network element assignment 165), and may connect user device 110 to service provider 125.

FIG. 2 is an exemplary diagram of a device 200 that may correspond to user device 110, a network element 120, service provider 125, assignment interface server 130, database server 135, and/or an assignment server 140. As illustrated, device 200 may include a bus 210, processing logic 220, a main memory 230, a read-only memory (ROM) 240, a storage device 250, an input device 260, an output device 270, and/or a communication interface 280. Bus 210 may include a path that permits communication among the components of device 200.

Processing logic 220 may include a processor, microprocessor, or other type of processing logic that may interpret and execute instructions. Main memory 230 may include a random access memory (RAM) or another type of dynamic storage device that may store information and instructions for execution by processing logic 220. ROM 240 may include a ROM device or another type of static storage device that may store static information and/or instructions for use by processing logic 220. Storage device 250 may include a magnetic and/or optical recording medium and its corresponding drive.

Input device 260 may include a mechanism that permits an operator to input information to device 200, such as a keyboard, a mouse, a pen, a microphone, voice recognition and/or biometric mechanisms, etc. Output device 270 may include a mechanism that outputs information to the operator, including a display, a printer, a speaker, etc. Communication interface 280 may include any transceiver-like mechanism that enables device 200 to communicate with other devices and/or systems. For example, communication interface 280 may include mechanisms for communicating with another device or system via a network, such as network 170.

As described herein, device 200 may perform certain operations in response to processing logic 220 executing software instructions contained in a computer-readable medium, such as main memory 230. A computer-readable medium may be defined as a physical or logical memory device. The software instructions may be read into main memory 230 from another computer-readable medium, such as storage device 250, or from another device via communication interface 280. The software instructions contained in main memory 230 may cause processing logic 220 to perform processes described herein. Alternatively, hardwired circuitry may be used in place of or in combination with software instructions to implement processes described herein. Thus, implementations described herein are not limited to any specific combination of hardware circuitry and software.

Although FIG. 2 shows exemplary components of device 200, in other implementations, device 200 may contain fewer, different, or additional components than depicted in FIG. 2. In still other implementations, one or more components of device 200 may perform one or more other tasks described as being performed by one or more other components of device 200.

FIG. 3 depicts an exemplary functional block diagram of assignment interface server 130. As illustrated, assignment interface server 130 may include query execution logic 300 and assignment generation logic 310. The functions described in FIG. 3 may be performed by one or more of the exemplary components of device 200 depicted in FIG. 2.

Query execution logic 300 may include any hardware and/or software based logic (e.g., processing logic 220) that enables assignment interface server 130 to generate a query (e.g., query 150) for defining an end-to-end path within one or more networks (e.g., network 115) that connects a customer (e.g., customer 105) to a network service (e.g., service provider 125). In one example, query execution logic 300 may receive end-to-end path request 145, may determine parameters of query 150 based on request 145 and/or various path criteria, and may provide query 150 to database server 135 for execution on a database of potential network elements 120 that may form the end-to-end path. End-to-end path request 145 may include network service information (e.g., the requested network service), customer information (e.g., customer name, location with respect to network 115, a LAM associated with the customer, etc.), etc.

The various path criteria may include one or more of the following exemplary path criteria: a number of subscribers on a virtual router (e.g., in network 115) is less than a capacity of the virtual router; a number of subscribers on a router (e.g., in network 115) is less than a capacity of the router; a number of subscribers on a switch (e.g., in network 115) is less than a capacity of the switch; a link between an ATM switch and a router (e.g., in network 115) has a PVC count of less than a maximum allowed; a link between a LAM and an ATM switch (e.g., in network 115) has a PVC count of less than a maximum allowed; a link between a LAM and another LAM (e.g., in network 115) has a PVC count of less than a maximum allowed; a LAM is available; a switch is available; a router is available; a link connecting a LAM to a switch is available with a non-zero scaling factor (e.g., a function of space-time); a link connecting a switch to a router is available with a non-zero scaling factor; a link connecting a LAM to another LAM is available with a non-zero scaling factor; an ATM switch is an Application Delivery Network (ADN) type; a used bandwidth on a link connecting a LAM to a switch is less than a maximum allowed bandwidth; and/or a used bandwidth on a link connecting a switch to a router is less than a maximum allowed bandwidth.

In one example, assignment interface server 130 (e.g., via query 150) may identify a potential best possible end-to-end path, and may identify a LAM for a location associated with customer 105. Assignment interface server 130 (e.g., via query 150) may determine if an end-to-end path exists for the LAM associated with customer 105 to service provider 125. If a path exists, assignment interface server 130 (e.g., via query 150) may identify one or more switches (e.g., ATM switches) and/or routers connected to the LAM in order to identify the end-to-end path from customer 105 to service provider 125. Assignment interface server 130 (e.g., via query 150) may mark (e.g., as "in use" or with some other designation) the selected LAM, switches, and/or routers to prevent resource conflicts (e.g., assigning the same end-to-end path (and/or network elements 120) to more than one customer). Assignment interface server 130 may store the defined end-to-end path (e.g., locally or within another device, such as database server 135).

Assignment generation logic 310 may include any hardware and/or software based logic (e.g., processing logic 220) that enables assignment interface server 130 to receive query results 155 (e.g., from database server 135), and to generate assignment results 160 based on query results 155. In one implementation, query results 155 may identify an end-to-end path associated with customer 105, network 115, network elements 120, and/or service provider 125. Assignment generation logic 310 may select network elements 120 for the end-to-end path based on query results 155, and may generate assignment results 160 based on the identified end-to-end path. Assignment results 160 may include an identification of network elements 120 (such as, e.g., marked or reserved network elements 120) that define the end-to-end path. Assignment generation logic 310 may provide assignment results 160 to one or more assignment servers 140. For example, assignment generation logic 310 may provide assignment results 160 to a next available assignment server 140.

In one exemplary implementation, assignment interface server 130 may place an end-to-end path request on hold if the same network element(s) 120 are defined for another end-to-end path request. This may prevent resource conflicts (i.e., assigning the same network element(s) 120 that define an end-to-end path) for two different requests.

Although FIG. 3 shows exemplary functional components of assignment interface server 130, in other implementations, assignment interface server 130 may contain fewer, different, or additional functional components than depicted in FIG. 3. In still other implementations, one or more functional components of assignment interface server 130 may perform one or more other tasks described as being performed by one or more other functional components of assignment interface server 130.

FIG. 4 illustrates an exemplary functional block diagram of assignment server 140. As illustrated, assignment server 140 may include customer based assignment logic 400, switch assignment logic 410, router assignment logic 420, and direct PVC assignment logic 430. The functions described in FIG. 4 may be performed by one or more of the exemplary components of device 200 depicted in FIG. 2.

Customer based assignment logic 400 may include any hardware and/or software based logic (e.g., processing logic 220) that enables assignment server 140 to assign a line access multiplexer (LAM) associated with a customer (e.g., customer 105). In one implementation, customer based assignment logic 400 may receive assignment results 160 (e.g., marked or reserved network elements 120), and may assign a LAM virtual path identifier (VPI) and/or virtual channel identifier (VCI) 440 for the end-to-end path defined by assignment results 160. A "VPI" may include an eight-bit field in a cell header that identifies a virtual path (e.g., a bundle of virtual channels that have a same endpoint) to which the cell belongs as it travels through a network. A "virtual channel" may include a logical connection between two end devices on a network. A "VCI" may include a sixteen-bit field in a cell header that identifies a next destination of the cell as it travels through a network. LAM VPI/VCI 440 may include a VPI and/or a VCI of a LAM (e.g., network element 120) assigned to a customer. In one example, customer based assignment logic 400 may assign LAM VPI/VCI 440 based on a customer type (e.g., a residential customer, a business customer, etc.), based on a pool or group of LAM VPI/VCIs, based on a physical port connected to the customer (e.g., a port of user device 110 associated with customer 105), etc. In another example, customer based assignment logic 400 may mark the assigned LAM VPI/VCI 440 as "in use" for a particular customer.

Switch assignment logic 410 may include any hardware and/or software based logic (e.g., processing logic 220) that enables assignment server 140 to assign one or more switches to a customer (e.g., customer 105). In one implementation, switch assignment logic 410 may receive assignment results 160 (e.g., that indicate one or more network elements 120), and may assign a switch VPI/VCI 450 for the end-to-end path defined by assignment results 160. Switch VPI/VCI 450 may include a VPI and/or a VCI of a switch (e.g., network element 120) assigned to the customer. In one example, switch assignment logic 410 may assign switch VPI/VCI 450 based on a type (e.g., model type, brand type, etc.) of the assigned switch.

Router assignment logic 420 may include any hardware and/or software based logic (e.g., processing logic 220) that enables assignment server 140 to assign one or more routers to a customer (e.g., customer 105). In one implementation, router assignment logic 420 may receive assignment results 160 (e.g., that indicate one or more network elements 120), and may assign a router VPI/VCI 460 for the end-to-end path defined by assignment results 160. Router VPI/VCI 460 may include a VPI and/or a VCI of a router (e.g., network element 120) assigned to the customer. In one example, router assignment logic 420 may assign router VPI/VCI 460 based on a type (e.g., model type, brand type, etc.) of the assigned router.

Direct PVC assignment logic 430 may include any hardware and/or software based logic (e.g., processing logic 220) that enables assignment server 140 to assign one or more high capacity links (e.g., via a switch cloud) to a business customer (e.g., customer 105). Rather than assigning from the assigned router to service provider 125 (e.g., as with a residential customer), direct PVC assignment logic 430 may assign the assigned switch to a high capacity link via a switch cloud. The switch cloud may provide a high capacity link rather than a lower capacity link (e.g., provided between routers of a residential arrangement). In one implementation, direct PVC assignment logic 430 may receive assignment results 160 (e.g., that indicate one or more network elements 120), and may assign a high capacity link 470 (e.g., via a switch cloud) for the end-to-end path defined by assignment results 160. Direct PVC assignment logic 430 may query ingress and/or egress switches in the switch cloud defined by assignment results 160, as indicated by reference number 480, to determine their availability.

As further shown in FIG. 4, LAM VPI/VCI 440, switch VPI/VCI 450, router VPI/VCI 460, high capacity link 470, and/or ingress/egress switch query 480 may be collectively referred to as "assign network elements for path" 165. Assignment server 140 may use assign network elements for path 165 to activate an end-to-end path (e.g., end-to-end path 170) in a network (e.g., network 115), which may connect user device 110 to service provider 125. Since multiple assignment servers 140 may assign end-to-end paths simultaneously, assignment interface server 130 may ensure that the same network element(s) 120 are not assigned to more than one end-to-end path request at the same time. Thus, each assignment server 140 may activate unique end-to-end paths in parallel, which may prevent resource conflicts as well as reduce the time to assign the end-to-end paths for a large volume of customers.

Although FIG. 4 shows exemplary functional components of assignment server 140, in other implementations, assignment server 140 may contain fewer, different, or additional functional components than depicted in FIG. 4. In still other implementations, one or more functional components of assignment server 140 may perform one or more other tasks described as being performed by one or more other functional components of assignment server 140.

FIGS. 5-8 depict a flow chart of an exemplary process 500 for defining an end-to-end path for a large volume of new network service requests without causing resource conflicts, according to implementations described herein. In one implementation, process 500 may be performed by assignment interface server 130. In another implementation, some or all of process 500 may be performed by another device or group of devices, including or excluding assignment interface server 130.

As illustrated in FIG. 5, process 500 may begin with receipt of a request for an end-to-end path from a customer (block 510), and a determination of query parameters based on the request and path criteria (block 520). For example, in implementations described above in connection with FIG. 3, query execution logic 300 of assignment interface server 130 may receive end-to-end path request 145, and may determine parameters of query 150 based on request 145 and/or various path criteria. End-to-end path request 145 may include network service information (e.g., the requested network service), customer information (e.g., customer name, location with respect to network 115, a LAM associated with the customer, etc.), etc. In one example, customer 105 may access assignment server 130 (e.g., via user device 110 and/or by logging in), and may provide the necessary information (e.g., end-to-end path request 145) to assignment server 130. Alternatively, customer 105 may simply request a network service from network 115, and assignment server 130 may automatically determine the end-to-end path based on the request.

As further shown in FIG. 5, a query may be executed on a database of potential network elements that may be included in the path (block 530), and one or more network elements for the path may be selected based on results of the query (block 540). For example, in implementations described above in connection with FIG. 3, query execution logic 300 may provide query 150 to database server 135 for execution on a database of potential network elements 120 that may form the end-to-end path. Assignment generation logic 310 of assignment interface server 130 may receive query results 155 (e.g., from database server 135). In one example, query results 155 may identify an end-to-end path associated with customer 105, network 115, network elements 120, and/or service provider 125, and assignment generation logic 310 may select network elements 120 for the end-to-end path based on query results 155.

Returning to FIG. 5, the selected one or more network elements may be reserved or marked for the path in the database (block 550), and the marked one or more network elements may be provided to an assignment server (block 560). For example, in implementations described above in connection with FIG. 3, assignment interface server 130 (e.g., via query 150) may mark (e.g., as "in use" or with some other designation) the selected LAM, switches, and/or routers to prevent resource conflicts (e.g., assigning the same end-to-end path (and/or network elements 120) to more than one customer). Assignment generation logic 310 may generate assignment results 160 based on query results 155. Assignment results 160 may include an identification of network elements 120 (e.g., marked or reserved network elements 120) that define the end-to-end path. Assignment generation logic 310 may provide assignment results 160 to one or more assignment servers 140. In one example, assignment servers 140 may define the end-to-end path (e.g., end-to-end path 170) for customer 105, and customer 105 may use the end-to-end path to access a network service (e.g., provided by service provider 125).

Process block 520 may include the process blocks illustrated in FIG. 6. As shown in FIG. 6, process block 520 may include one or more of determining the query parameters based on a capacity of a virtual router (block 600), a capacity of a router (block 610), a capacity of a switch (block 620), an availability of a router (block 630), an availability of a switch (block 640), an availability of a link connecting a router and a switch (block 650), an availability of a link connecting a LAM and a switch (block 660), and/or a capacity of a link connecting a router and a switch (block 670). For example, in implementations described above in connection with FIG. 3, query execution logic 300 may receive end-to-end path request 145, and may determine parameters of query 150 based on request 145 and/or various path criteria. The various path criteria may include one or more of the following exemplary path criteria: a number of subscribers on a virtual router is less than a capacity of the virtual router; a number of subscribers on a router is less than a capacity of the router; a number of subscribers on a switch is less than a capacity of the switch; a switch is available; a router is available; a link connecting a LAM to a switch is available with a non-zero scaling factor; a link connecting a switch to a router is available with a non-zero scaling factor; and/or a used bandwidth on a link connecting a switch to a router is less than a maximum allowed bandwidth.

Alternatively and/or additionally, process block 520 may include the process blocks illustrated in FIG. 7. As shown in FIG. 7, process block 520 may include one or more of determining the query parameters based on a capacity of a link connecting an ATM switch and a router (block 700), a capacity of a link connecting a LAM and an ATM switch (block 710), a capacity of a link connecting a LAM and another LAM (block 720), an availability of a LAM (block 730), an availability of a link connecting a LAM and another LAM (block 740), an ATM switch type (block 750), and/or a capacity of a link connecting a LAM and switch (block 760). For example, in implementations described above in connection with FIG. 3, query execution logic 300 may receive end-to-end path request 145, and may determine parameters of query 150 based on request 145 and/or various path criteria. The various path criteria may include one or more of the following exemplary path criteria: a link between an ATM switch and a router has a PVC count of less than a maximum allowed; a link between a LAM and an ATM switch has a PVC count of less than a maximum allowed; a link between a LAM and another LAM has a PVC count of less than a maximum allowed; a LAM is available; a link connecting a LAM to another LAM is available with a non-zero scaling factor; an ATM switch is an ADN type; and/or a used bandwidth on a link connecting a LAM to a switch is less than a maximum allowed bandwidth.

Process block 540 may include the process blocks illustrated in FIG. 8. As shown in FIG. 8, process block 540 may include selecting a line access multiplexer (LAM) based on a location of the customer (block 800), and determining the end-to-end path from the LAM to a service provider (block 810). For example, in implementations described above in connection with FIG. 3, assignment interface server 130 (e.g., via query 150) may identify a LAM for a location associated with customer 105, and may determine if an end-to-end path exists for the LAM associated with customer 105 to service provider 125. If a path exists, assignment interface server 130 (e.g., via query 150) may identify one or more switches (e.g., ATM switches) and/or routers connected to the LAM in order to identify the end-to-end path from customer 105 to service provider 125. If a path does not exist, assignment interface server 130 may contact owner of network 115, and may inform the owner that additional resources are needed to provide network services to customers. Assignment interface server 130 may also inform customer 105 that connection to the network service is unavailable at this time.

FIGS. 9 and 10 depict a flow chart of an exemplary process 900 for assigning an end-to-end path for a large volume of new network service requests without causing resource conflicts, according to implementations described herein. In one implementation, process 900 may be performed by one or more of assignment servers 140. In another implementation, some or all of process 900 may be performed by another device or group of devices, including or excluding assignment servers 140.

As illustrated in FIG. 9, process 900 may begin with receipt of one or more marked network elements for an end-to-end path from an assignment interface server (block 910), and assignment of a line access multiplexer (LAM) virtual path identifier (VPI) and/or virtual channel identifier (VCI) based on the one or more marked network elements (block 920). For example, in implementations described above in connection with FIG. 4, customer based assignment logic 400 of assignment server 140 may receive assignment results 160 (e.g., marked or reserved network elements 120), and may assign a line access multiplexer (LAM) virtual path identifier (VPI) and/or virtual channel identifier (VCI) 440 for the end-to-end path defined by assignment results 160. LAM VPI/VCI 440 may include a VPI and/or a VCI of a LAM (e.g., network element 120) assigned to a customer.

As further shown in FIG. 9, a switch VPI and/or VCI may be assigned based on the one or more marked network elements (block 930), and a router VPI and/or VCI may be assigned based on the one or more marked network elements (block 940). For example, in implementations described above in connection with FIG. 4, switch assignment logic 410 of assignment server 140 may receive assignment results 160 (e.g., marked or reserved network elements 120), and may assign switch VPI/VCI 450 for the end-to-end path defined by assignment results 160. Switch VPI/VCI 450 may include a VPI and/or a VCI of a switch (e.g., network element 120) assigned to the customer. Router assignment logic 420 of assignment server 140 may receive assignment results 160 (e.g., marked or reserved network elements 120), and may assign router VPI/VCI 460 for the end-to-end path defined by assignment results 160. Router VPI/VCI 460 may include a VPI and/or a VCI of a router (e.g., network element 120) assigned to the customer.

Returning to FIG. 9, a high capacity link may be assigned via a switch cloud and based on the one or more marked network elements (block 950), ingress and/or egress switches in the switch cloud may be queried to determine their availability (block 960), and the end-to-end path may be activated based on the assignments (block 970). For example, in implementations described above in connection with FIG. 4, direct PVC assignment logic 430 of assignment server 140 may receive assignment results 160 (e.g., marked or reserved network elements 120), and may assign high capacity link 470 (e.g., via a switch cloud) for the end-to-end path defined by assignment results 160. Direct PVC assignment logic 430 may query ingress and/or egress switches in the switch cloud defined by assignment results 160, as indicated by reference number 480, to determine their availability. LAM VPI/VCI 440, switch VPI/VCI 450, router VPI/VCI 460, high capacity link 470, and/or ingress/egress switch query 480 may be collectively referred to as assign network elements for path

165. Assignment server 140 may use "assign network elements for path" 165 to activate an end-to-end path (e.g., end-to-end path 170) in a network (e.g., network 115), which may connect user device 110 to service provider 125. Customer 105 may then use the end-to-end path to access a network service (e.g., provided by service provider 125).

Process block 920 may include the process blocks illustrated in FIG. 10. As shown in FIG. 10, process block 920 may include assigning a line access multiplexer (LAM) virtual path identifier (VPI) and/or virtual channel identifier (VCI) based on a customer type (block 1000), assigning the LAM VPI/VCI based on a pool of LAMs and/or a physical port connected to the customer (e.g., a port of user device 110 associated with customer 105) (block 1010), and marking the assigned LAM VPI/VCI as reserved for the customer (block 1020). For example, in implementations described above in connection with FIG. 4, customer based assignment logic 400 may assign LAM VPI/VCI 440 based on customer type (e.g., a residential customer, a business customer, etc.), based on a pool or plurality of LAM VPI/VCIs, based on a physical port connected to the customer (e.g., a port of user device 110 associated with customer 105), etc. In another example, customer based assignment logic 400 may mark the assigned LAM VPI/VCI 440 as "in use" (i.e., reserved) for a particular customer.

Implementations described herein may include systems and/or methods that define an end-to-end path for a large volume of new network service requests without causing resource conflicts. For example, in one implementation, the systems and/or methods may receive a request for an end-to-end path from a customer, and may determine query parameters based on the request and/or various path criteria. The query may be executed on a database of potential network elements that may form the end-to-end path, and network elements for the end-to-end path may be selected based on the query results. The selected network elements may be reserved (or marked as "in use") in the database, and information identifying the reserved or marked network elements may be output for activation of the end-to-end path.

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 5-10, the order of the blocks may be modified in other implementations. Further, non-dependent blocks may be performed in parallel.

Also, the terms "user" and/or "customer" have been used herein, and are intended to be broadly interpreted to include user device 110 or a user (e.g., customer 105) of user device 110.

It will be apparent that embodiments, as described herein, may be implemented in many different forms of software, firmware, and hardware in the implementations illustrated in the figures. The actual software code or specialized control hardware used to implement embodiments described herein is not limiting of the invention. Thus, the operation and behavior of the embodiments were described without reference to the specific software code—it being understood that one would be able to design software and control hardware to implement the embodiments based on the description herein.

Further, certain portions of the invention may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the invention. In fact, many of these features may be combined in ways not specifically recited in the claims and/or disclosed in the specification.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computing device-implemented method, comprising:
   receiving, from a customer, a request for an end-to-end path through a network;
   determining parameters of a query based on the request and path criteria,
   the determining the parameters of the query comprising at least one of:
      determining parameters of the query based on a capacity of at least one network element, or
      determining parameters of the query based on an availability of the at least one network element;
   executing the query, using the determined parameters, on a memory that stores information identifying network elements to be included in one or more end-to-end paths;
   selecting, based on a result of executing the query and in the memory, information identifying each of one or more network elements of the network elements when the result includes information indicating that the one or more network elements are available for the end-to-end path,
   the information identifying each of the one or more network elements being not selected when the result includes information indicating that the one or more network elements are not available for the end-to-end path, and
   the selecting the information identifying each of the one or more network elements comprising:
      selecting, based on information identifying a location of the customer and from the information identifying each of the network elements stored in the memory, information identifying a line access multiplexer (LAM) of the network, the one or more network elements including the LAM;
   modifying, in the memory, the information identifying each of the one or more network elements to include information indicating that the one or more network elements are reserved for use for the end-to-end path;
   determining the end-to-end path from the LAM to a service provider associated with the request; and
   providing the information identifying each of the one or more network elements to a server for activation of the one or more network elements for the end-to-end path.

2. The computing device-implemented method of claim 1, where providing the information identifying each of the one or more network elements comprises:
   providing the information identifying each of the one or more network elements to an assignment server for the activation of the requested end-to-end path.

3. The computing device-implemented method of claim 1, where determining the parameters of the query further comprises at least one of:
   determining parameters of the query based on a capacity and an availability of a router of the network;

determining parameters of the query based on a capacity of a virtual router of the network;

determining parameters of the query based on a capacity of a switch of the network;

determining parameters of the query based on an availability of the switch;

determining parameters of the query based on an availability of a link connecting the router and the switch;

determining parameters of the query based on an availability of a link connecting the switch and the LAM; or determining parameters of the query based on a capacity of the link connecting the router and the switch.

4. The computing device-implemented method of claim 1, where determining the parameters of the query further comprises at least one of:

determining parameters of the query based on a capacity of a link connecting an asynchronous transfer mode (ATM) switch and a router of the network;

determining parameters of the query based on a capacity of a link connecting the ATM switch and the LAM;

determining parameters of the query based on a capacity of a link connecting the LAM and another LAM of the network;

determining parameters of the query based on an availability of the LAM;

determining parameters of the query based on an availability of the link connecting the LAM and the other LAM;

determining parameters of the query based on a type of the ATM switch; or determining parameters of the query based on an availability of a link connecting the LAM and a switch of the network.

5. A computer-readable memory device comprising:

one or more instructions which, when executed by a processor, cause the processor to:

receive, from a customer, a request for an end-to-end path, through a network, that connects a device, of the customer, to a device of a service provider that provides a network service;

determine parameters of a query, to be executed on a memory that stores information identifying network elements, based on the request, execute the query, comprising the determined parameters, on the memory, a result of executing the query including information identifying an availability of each of a plurality of the network elements;

select information identifying one or more network elements, of the plurality of the network elements, stored in the memory, based on the information identifying the availability of the one or more network elements indicating that the one or more network elements are available, information identifying other network elements, of the plurality of the network elements, being not selected when the information identifying the availability of the other network elements indicates that the other network elements are not available, and the one or more instructions to select the information identifying the one or more network elements including:

one or more instructions to select, based on a location of the customer and from the information identifying the network elements stored in the memory, information identifying a line access multiplexer (LAM) of the network, the request including the information identifying the location of the customer, and the one or more network elements including the LAM;

modify, in the memory, the information identifying the one or more network elements to include information indicating that the one or more network elements are being used for the end-to-end path;

determine the end-to-end path from the LAM to a service provider associated with the network service; and provide the information identifying the one or more network elements to a server for activation of the end-to-end path to connect the device, of the customer, to the device of the service provider that provides the network service.

6. The computer-readable memory device of claim 5, where the customer corresponds to a first customer and comprises one of a residential customer or a business customer, where the end-to-path corresponds to a first end-to-end path, and where the computer-readable memory device further comprising one or more instructions to:

receive, from a second customer, another request for a second end-to-end path, through the network, that connects a device, of the second customer, to a device of a second service provider that provides a second network service;

execute another query on the memory;

select, in the memory, information identifying one or more other network elements of the network elements, based on a result of executing the other query and the information indicating that the one or more network elements are being used for the end-to-end path; and modify, in the memory, the information identifying the one or more other network elements to include information indicating that the one or more other network elements are being used for the second end-to-end path.

7. The computer-readable memory device of claim 5, where the network service comprises at least one of:

a telephone service;

an Internet service;

a network data service;

a radio service;

a television service; or a video service.

8. The computer-readable memory device of claim 5, where the memory further stores:

information associated with an availability of each of the network elements;

information associated with a capacity of each of the network elements; and at least one of:

information associated with a capacity of links between the network elements;

information associated with an availability of the links between the network elements;

information associated with bandwidth of each of the network elements; or information associated with bandwidth of the links between the network elements.

9. The computer-readable memory device of claim 5, where each of the network elements comprises at least one of:

a gateway;

a router;

a switch;

an asynchronous transfer mode (ATM) switch;
a firewall;
a network interface card (NIC);
a hub;
a bridge;
a proxy server;
an optical add-drop multiplexer (OADM);
a line access multiplexer (LAM); or
a permanent or private virtual circuit (PVC), and
where the memory is included in a device that is different than the network elements.

10. The computer-readable memory device of claim 5, where the one or more instructions to determine the parameters of the query further comprise at least one of:
one or more instructions to determine parameters of the query based on a capacity of a virtual router of the network;
one or more instructions to determine parameters of the query based on a capacity of a switch of the network;
one or more instructions to determine parameters of the query based on an availability of the switch;
one or more instructions to determine parameters of the query based on an availability of a link connecting the virtual router and the switch;
one or more instructions to determine parameters of the query based on an availability of a link connecting the switch and the LAM; or
one or more instructions to determine parameters of the query based on a capacity of the link connecting the virtual router and the switch.

11. The computer-readable memory device of claim 5, where the one or more instructions to determine the parameters of the query further comprise at least one of:
one or more instructions to determine parameters of the query based on a capacity of a link connecting an asynchronous transfer mode (ATM) switch and a router of the network;
one or more instructions to determine parameters of the query based on a capacity of a link connecting the ATM switch and the LAM;
one or more instructions to determine parameters of the query based on a capacity of a link connecting the LAM and another LAM of the network;
one or more instructions to determine parameters of the query based on an availability of the LAM;
one or more instructions to determine parameters of the query based on an availability of the link connecting the LAM and the other LAM;
one or more instructions to determine parameters of the query based on a type of the ATM switch; or
one or more instructions to determine parameters of the query based on an availability of the link connecting the LAM and a switch of the network.

12. The computer-readable memory device of claim 5, where at least one of the one or more network elements includes at least one of:
a gateway;
a router;
a switch;
an asynchronous transfer mode (ATM) switch;
a firewall;
a network interface card (NIC);
a hub;
a bridge;
a proxy server;
an optical add-drop multiplexer (OADM); or
a permanent or private virtual circuit (PVC).

13. The computer-readable memory device of claim 5, where:
the customer includes one of a residential user or a business user; and
the network service comprises at least one of:
a telephone service,
an Internet service,
a network data service,
a radio service,
a television service, or
a video service.

14. A system, comprising:
one or more network devices to:
receive, from a user, a request for an end-to-end path through a network, the request comprising information identifying a network service for the end-to-path and information identifying the user;
determine parameters of a query based on the request and path criteria associated with the end-to-end path, the determined parameters comprising an availability of at least one network element for the end-to-end path;
execute the query on a memory that stores information identifying a plurality of network elements to be included in a plurality of end-to-end paths;
select information identifying one or more network elements, of the plurality of the network elements, stored in the memory, when results of the query include information indicating that the one or more network elements are available for the end-to-end path,
when selecting the information identifying the one or more network elements, the one or more network devices are to:
select, based on a location of the user and from the information identifying the plurality of network elements stored in the memory, information identifying a line access multiplexer (LAM) of the network, the location of the user being included in the information identifying the user, and the one or more network elements including the LAM;
modify, in the memory, the information identifying the one or more network elements for the end-to-end path, to indicate that the one or more network elements are in use for the end-to-end path;
determine the end-to-end path from the LAM to a service provider associated with the network service; and
activate the end-to-end path based on the assigned virtual path identifier or the assigned virtual channel identifier.

15. The system of claim 14, where the information identifying the network service identifies one of:
a radio service,
a television service, or
a video service.

16. The system of claim 14, where the memory is included in a device that is different than the plurality of network elements, and
where the determined parameters further comprise:
an availability of a router,
an availability of a link connecting the router and a switch, or
bandwidth information associated with the plurality of network elements.

17. The system of claim 14, where the one or more network devices are further to:

assign a virtual path identifier or a virtual channel identifier for at least one of the one or more network elements, based on the modified information identifying the one or more network elements.

18. The system of claim 17, where, when assigning the virtual path identifier or the virtual channel identifier, the one or more network devices are to at least one of:
assign a virtual path identifier or a virtual channel identifier for the LAM based on the information identifying the one or more network elements;
assign a virtual path identifier or a virtual channel identifier for a switch of the network based on the information identifying the one or more network elements; or
assigning a virtual path identifier or a virtual channel identifier for a router of the network based on the information identifying the one or more network elements.

19. The system of claim 18, where, when assigning the virtual path identifier or the virtual channel identifier for the LAM, the one or more network devices are to at least one of:
assign the virtual path identifier or the virtual channel identifier for the LAM based on a plurality of virtual path identifiers or a plurality of virtual channel identifiers; or
assign the virtual path identifier or the virtual channel identifier for the LAM based on a physical port associated with the user.

20. The system of claim 18, where, when assigning the virtual path identifier or the virtual channel identifier for the LAM, the one or more network devices are to:
assign the virtual path identifier or the virtual channel identifier for the LAM based on a type of the user.

21. A device comprising:
a memory to store instructions; and
one or more processors to:
receive, from a first user, a request for a first end-to-end path through a network,
determine, based on the request, parameters of a query, to be executed on a memory that stores information identifying network elements,
execute the query, including the determined parameters, on the memory, a result of executing the query including information identifying an availability of each of a plurality of the network elements,
select information identifying one or more network elements of the plurality of the network elements, stored in the memory, based on the information identifying the availability of the one or more network elements indicating that the one or more network elements are available,
modify, in the memory, the information identifying the one or more network elements to include information indicating that the one or more network elements are being used for the first end-to-end path,
provide the information identifying the one or more network elements to a server for activation of the first end-to-end path,
receive, from a second user, another request for a second end-to-end path through the network,
execute another query, that is based on the other request, on the memory,
select, in the memory, information identifying one or more other network elements of the network elements, based on a result of executing the other query and the information indicating that the one or more network elements are being used for the first end-to-end path, and
modify, in the memory, the information identifying the one or more other network elements to include information indicating that the one or more other network elements are being used for the second end-to-end path.

22. The device of claim 21, where the information identifying the network elements includes at least one of:
information identifying an availability of each of the network elements,
information identifying a capacity of each of the network elements,
information identifying a capacity of links between the network elements,
information identifying an availability of the links between the network elements,
information identifying bandwidth of each of the network elements, or
information identifying bandwidth of the links between the network elements.

23. A method comprising:
receiving, from a first user, a request for a first end-to-end path through a network;
determining, based on the request, parameters of a first query, to be executed on a memory that stores information identifying network elements;
executing the first query, including the determined parameters, on the memory, a result of executing the first query including information identifying an availability of each of a plurality of the network elements;
selecting information identifying one or more network elements of the plurality of the network elements, stored in the memory, based on the information identifying the availability of the one or more network elements indicating that the one or more network elements are available;
modifying, in the memory, the information identifying the one or more network elements to include information indicating that the one or more network elements are being used for the first end-to-end path;
providing the information identifying the one or more network elements to a server for activation of the first end-to-end path;
receiving, from a second user, another request for a second end-to-end path through the network;
executing a second query, that is based on the other request, on the memory;
selecting, in the memory, information identifying one or more other network elements of the network elements, based on a result of executing the second query and the information indicating that the one or more network elements are being used for the first end-to-end path; and
modifying, in the memory, the information identifying the one or more other network elements to include information indicating that the one or more other network elements are being used for the second end-to-end path.

24. The method of claim 23, where the information identifying the network elements includes at least one of:
information identifying an availability of each of the network elements,
information identifying a capacity of each of the network elements,
information identifying a capacity of links between the network elements,
information identifying an availability of the links between the network elements,
information identifying bandwidth of each of the network elements, or
information identifying bandwidth of the links between the network elements.

25. The method of claim 23, where determining the parameters of the first query further comprises determining parameters of the first query based on at least one of:
- a capacity and an availability of a router of the network;
- a capacity of a virtual router of the network;
- a capacity of a switch of the network;
- an availability of the switch;
- an availability of a link connecting the router and the switch;
- an availability of a link connecting the switch and a line access multiplexer (LAM) of the network; or
- a capacity of the link connecting the router and the switch.

* * * * *